(12) United States Patent
Campbell

(10) Patent No.: US 8,867,365 B2
(45) Date of Patent: *Oct. 21, 2014

(54) METHODS AND COMPUTER PROGRAM PRODUCTS FOR ROUTE DETERMINATION

(75) Inventor: Gary L. Campbell, Richardson, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 468 days.

This patent is subject to a terminal disclaimer.

(21) Appl. No.: 12/886,033

(22) Filed: Sep. 20, 2010

(65) Prior Publication Data

US 2011/0007635 A1    Jan. 13, 2011

Related U.S. Application Data

(63) Continuation of application No. 11/769,836, filed on Jun. 28, 2007, now Pat. No. 7,827,306.

(51) Int. Cl.
*H04L 12/26* (2006.01)
*H04Q 3/66* (2006.01)

(52) U.S. Cl.
CPC ....... *H04Q 3/66* (2013.01); *H04Q 2213/13389* (2013.01); *H04Q 2213/13164* (2013.01); *H04Q 2213/13141* (2013.01); *H04Q 2213/13296* (2013.01); *H04Q 2213/13166* (2013.01); *H04Q 2213/13384* (2013.01); *H04Q 2213/13383* (2013.01); *H04Q 2213/1329* (2013.01)

USPC ........... 370/238; 370/230; 370/229; 370/392; 370/389; 709/244; 709/224

(58) Field of Classification Search
CPC ......... H04L 45/00; H04L 45/12; H04L 47/10; H04L 45/16; H04L 29/0653
USPC .............. 370/238, 239, 230, 395.1, 392, 389, 370/229; 379/219–241; 709/239–244, 224, 709/249

See application file for complete search history.

(56) References Cited

U.S. PATENT DOCUMENTS

| | | | |
|---|---|---|---|
| 7,047,316 B2 * | 5/2006 | Iwata et al. | 709/240 |
| 7,240,093 B1 | 7/2007 | Danieli et al. | |
| 2002/0178225 A1 | 11/2002 | Madenberg et al. | |
| 2003/0118024 A1 * | 6/2003 | Lee et al. | 370/395.1 |
| 2004/0172471 A1 * | 9/2004 | Porter | 709/224 |
| 2005/0259647 A1 * | 11/2005 | Wakumoto et al. | 370/389 |
| 2006/0018252 A1 * | 1/2006 | Sridhar et al. | 370/216 |
| 2007/0150444 A1 * | 6/2007 | Chesnais et al. | 707/3 |

* cited by examiner

*Primary Examiner* — Jamal Javaid

(57) ABSTRACT

Methods and computer program products are provided for improved routing by evaluating routing alternatives based on multiple-path elements. The homing models provide a solution for improved access homing while balancing latency, load-balancing, and diversity needs by viewing each network in isolation or the combination of networks as a single network.

11 Claims, 14 Drawing Sheets

INTERMEDIATE STEP IN OPTION 1

| NPANXX HOMED | LATA |
|---|---|
| 863965 | 952 |

| Access Node 1 | FLAG | MILES FROM Origin Node | ST | CITY |
|---|---|---|---|---|
| LKLD.MIC | | 6.5 | FL | LAKELAND |

| Access Node 2 | FLAG | MILES FROM Origin Node | ST | CITY |
|---|---|---|---|---|
| TAMP.LIT | | 40.8 | FL | TAMPA |

| Egress Node 1 | FLAG | MILES FROM Access Node 1 | MILES FROM Access Node 2 | ST | CITY |
|---|---|---|---|---|---|
| TAMP.LIT | | 34.3 | 0.0 | FL | TAMPA |

| Egress Node 2 | FLAG | MILES FROM Access Node 1 | MILES FROM Access Node 2 | ST | CITY |
|---|---|---|---|---|---|
| JCVL.JAP | | 158.2 | 170.1 | FL | JACKSONVILLE |

| Egress Node 3 | FLAG | MILES FROM Access Node 1 | MILES FROM Access Node 2 | ST | CITY |
|---|---|---|---|---|---|
| FTLD.LD2 | | 169.4 | 188.9 | FL | FORT LAUDERDALE |

INTERMEDIATE STEP IN OPTION 2

| NPANXX HOMED | LATA |
|---|---|
| 863965 | 952 |

| Access Node 1 | FLAG | MILES FROM Origin Node | ST | CITY |
|---|---|---|---|---|
| AUB | | 0.0 | FL | AUBURNDALE,FL,JCT/TERM |

| Access Node 2 | FLAG | MILES FROM Origin Node | ST | CITY |
|---|---|---|---|---|
| TPX | | 41.6 | FL | TAMPA - LEASE 952 |

| Egress Node 1 | FLAG | MILES FROM Access Node 1 | MILES FROM Access Node 2 | ST | CITY |
|---|---|---|---|---|---|
| AUB | | 0.0 | 41.6 | FL | AUBURNDALE,FL,JCT/TERM |

| Egress Node 2 | FLAG | MILES FROM Access Node 1 | MILES FROM Access Node 2 | ST | CITY |
|---|---|---|---|---|---|
| JAP | | 155.9 | 170.3 | FL | JACKSONVILLE - JCT/TERM |

| Egress Node 3 | FLAG | MILES FROM Access Node 1 | MILES FROM Access Node 2 | ST | CITY |
|---|---|---|---|---|---|
| POB | | 161.5 | 185.5 | FL | POMPANO BCH,FL,JCT/TERM |

FIG. 8

| NPANXX HOMED | LATA |
|---|---|
| 863965 | 952 |

OUTPUT OF OPTION 1

| Access Node 1 | FLAG | Miles From Origin Node | Egress Node 1 | Miles From Access Node 1 | Egress Node 2 | Miles From Access Node 1 | Egress Node 3 | Miles From Access Node 1 |
|---|---|---|---|---|---|---|---|---|
| LKLD.MIC | | 6.5 | TAMP.LIT | 34.3 | JCVL.JAP | 158.2 | FTLD.LD2 | 169.4 |

OUTPUT OF OPTION 2

| Access Node 1 | FLAG | Miles From Origin Node | Egress Node 1 | Miles From Access Node 1 | Egress Node 2 | Miles From Access Node 1 | Egress Node 3 | Miles From Access Node 1 |
|---|---|---|---|---|---|---|---|---|
| AUB | | 0.0 | AUB | 0.0 | JAP | 155.9 | POB | 161.5 |

FIG. 9

| NPANXX HOMED | LATA | | COMBINATION HOMING MODEL AFTER LEAST DISTANCE | | |
|---|---|---|---|---|---|
| 863965 | 952 | | | | |

| OPTION 2 | MILES to Access | MILES to Origin | | | |
|---|---|---|---|---|---|
| Egress Node 1 | Node 1 | Node | ST | SITE NAME | 1. |
| AUB | 0.0 | 0.0 | FL | AUBURNDALE, FL, JCT/TERM | |

| OPTION 1 | MILES to Access | MILES to Origin | | | |
|---|---|---|---|---|---|
| Egress Node 1 | Node 1 | Node | ST | SITE NAME | 2. |
| TAMP.LIT | 34.3 | 40.7 | FL | TAMPA | |

| OPTION 2 | MILES to Access | MILES to Origin | | | |
|---|---|---|---|---|---|
| Egress Node 2 | Node 1 | Node | ST | SITE NAME | 3. |
| JAP | 155.9 | 155.8 | FL | JACKSONVILLE - JCT/TERM | |

| OPTION 2 | MILES to Access | MILES to Origin | | | |
|---|---|---|---|---|---|
| Egress Node 3 | Node 1 | Node | ST | SITE NAME | 4. |
| POB | 161.5 | 161.5 | FL | POMPANO BEACH, FL, JCT/TERM | |

| OPTION 1 | MILES to Access | MILES to Origin | | | |
|---|---|---|---|---|---|
| Egress Node 2 | Node 1 | Node | ST | SITE NAME | 5. |
| JVCL.JAP | 158.2 | 164.6 | FL | JACKSONVILLE | |

| OPTION 1 | MILES to Access | MILES to Origin | | | |
|---|---|---|---|---|---|
| Egress Node 3 | Node 1 | Node | ST | SITE NAME | 6. |
| FTLD.LD2 | 169.4 | 175.8 | FL | FORT LAUDERDALE | |

FIG. 10

| NPANXX HOMED | LATA |
|---|---|
| 863965 | 952 |

COMBINATION HOMING MODEL AFTER LOAD BALANCE

| OPTION 2 Egress Node 1 | MILES to Access Node 1 | MILES to Origin Node | ST | SITE NAME | |
|---|---|---|---|---|---|
| AUB | 0.0 | 0.0 | FL | AUBURNDALE,FL,JCT/TERM | 1. |

| OPTION 1 Egress Node 1 | MILES to Access Node 1 | MILES to Origin Node | ST | SITE NAME | |
|---|---|---|---|---|---|
| TAMP.LIT | 34.3 | 40.7 | FL | TAMPA | 2. |

| OPTION 2 Egress Node 2 | MILES to Access Node 1 | MILES to Origin Node | ST | SITE NAME | |
|---|---|---|---|---|---|
| JAP | 155.9 | 155.8 | FL | JACKSONVILLE - JCT/TERM | 3. |

| OPTION 2 Egress Node 3 | MILES to Access Node 1 | MILES to Origin Node | ST | SITE NAME | |
|---|---|---|---|---|---|
| POB | 161.5 | 161.5 | FL | POMPANO BEACH, FL, JCT/TERM | 4. |

| OPTION 1 Egress Node 2 | MILES to Access Node 1 | MILES to Origin Node | ST | SITE NAME | |
|---|---|---|---|---|---|
| JVCL.JAP | 158.2 | 164.6 | FL | JACKSONVILLE | 5. |

| OPTION 1 Egress Node 3 | MILES to Access Node 1 | MILES to Origin Node | ST | SITE NAME | |
|---|---|---|---|---|---|
| FTLD.LD2 | 169.4 | 175.8 | FL | FORT LAUDERDALE | 6. |

FIG. 11

FIRST LOAD BALANCE

Do from ((1/10) * FIRST TOLERANCE FACTOR) to ((10/10) * FIRST TOLERANCE FACTOR) by tenths:

For each route choice

If 1st choice egress node exceeds the loading threshold AND

If 2nd choice egress node does not exceed the loading threshold AND

If the distance from the access node to the egress node of the 2nd choice < ((((ITERATION COUNT / 10) * FIRST TOLERANCE FACTOR) + the distance from the access node to the egress node of the 1st choice)

Then swap 1st & 2nd choice routes and adjust node counters.

Else If 1st choice egress node exceeds the loading threshold AND

If 3rd choice egress node does not exceed the loading threshold AND

If the distance from the access node to the egress node of the 3rd choice < ((((ITERATION COUNT / 10) * FIRST TOLERANCE FACTOR) + the distance from the access node to the egress node of the 1st choice)

Then swap 1st & 3rd choice routes and adjust node counters.

End.

At the end of each pass, check to determine if the load balancing goal has been reached.
End if the goal has been reached.

FIG. 12

SECOND LOAD BALANCE

Do from ((1/10) * SECOND TOLERANCE FACTOR) to ((10/10) * SECOND TOLERANCE FACTOR) by tenths:

For each route choice

If 1st choice egress node exceeds the loading threshold AND

If 2nd choice egress node does not exceed the loading threshold AND

If the distance from the access node to the egress node of the 2nd choice < (((ITERATION COUNT / 10) * SECOND TOLERANCE FACTOR) + the distance from the access node to the egress node of the 1st choice)

<u>Then swap 1st & 2nd choice routes and adjust node counters.</u>

Else If 1st choice egress node exceeds the loading threshold AND

If 3rd choice egress node does not exceed the loading threshold AND

If the distance from the access node to the egress node of the 3rd choice < (((ITERATION COUNT / 10) * SECOND TOLERANCE FACTOR) + the distance from the access node to the egress node of the 1st choice)

<u>Then swap 1st & 3rd choice routes and adjust node counters.</u>

Else If 1st choice egress node exceeds the loading threshold AND

If 4th choice egress node does not exceed the loading threshold AND

If the distance from the access node to the egress node of the 4th choice < (((ITERATION COUNT / 10) * SECOND TOLERANCE FACTOR) + the distance from the access node to the egress node of the 1st choice)

<u>Then swap 1st & 4th choice routes and adjust node counters.</u>

Else If 1st choice egress node exceeds the loading threshold AND

If 5th choice egress node does not exceed the loading threshold AND

If the distance from the access node to the egress node of the 5th choice < (((ITERATION COUNT / 10) * SECOND TOLERANCE FACTOR) + the distance from the access node to the egress node of the 1st choice)

<u>Then swap 1st & 5th choice routes and adjust node counters.</u>

End.

At the end of each pass, check to determine if the load balancing goal has been reached.
End if the goal has been reached.

FIG. 13

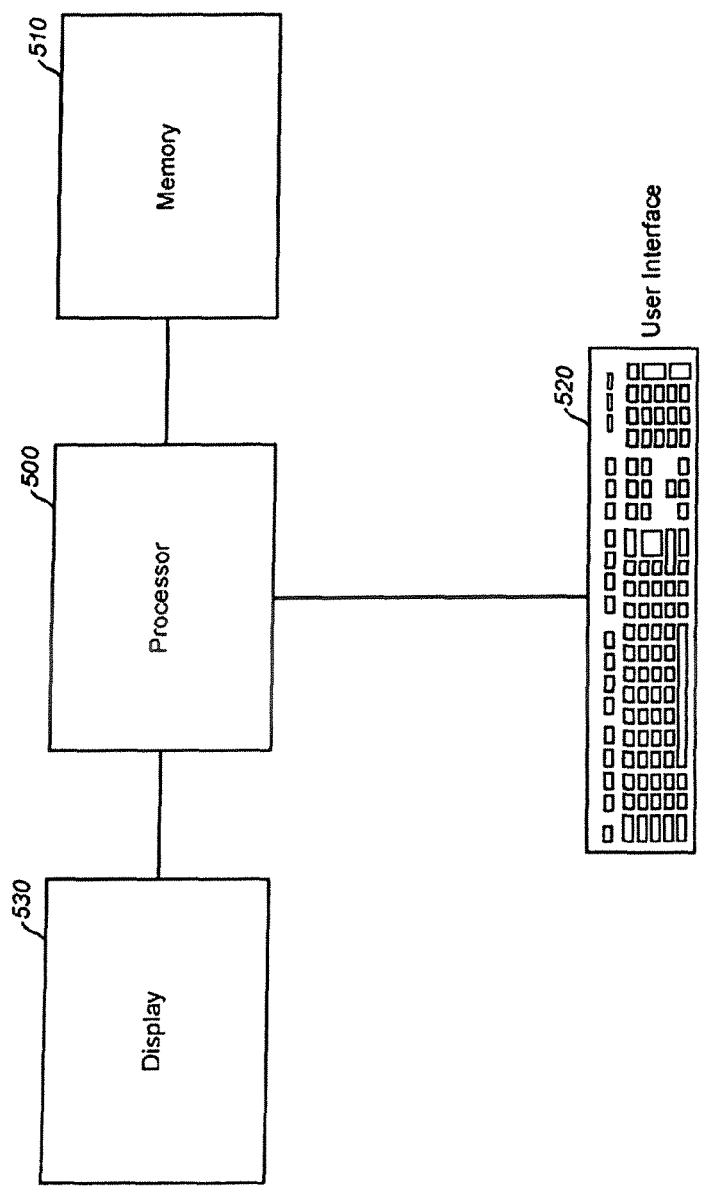

METHODS AND COMPUTER PROGRAM PRODUCTS FOR ROUTE DETERMINATION

CROSS-REFERENCE TO RELATED APPLICATIONS

This continuation application claims the benefit of U.S. application Ser. No. 11/769,836 filed Jun. 28, 2007, the disclosure of which is expressly incorporated herein by reference in its entirety.

BACKGROUND

As the number and types of communication networks have grown, so has the need to provide improved routing through these networks. In part, this is because separate networks are used in combination with one another. In some network architectures, legacy networks are used in combination with other legacy networks or more modern networks, e.g., frame relay, asynchronous transfer mode (ATM), and Private IP (PIP) networks. In other architectures, the various networks operate separately with the capability to provide the same services to various customers. Thus, the use of multiple networks with variable latency, diversity, and load-balancing requirements has increased the need for routing models that take into consideration these factors. This need is only exacerbated by combining networks resulting from mergers of telecommunications companies or other service providers, leasing lines of other service providers, and the continual deployment of new networks.

Notwithstanding this perpetual combination of networks, customers typically desire low-latency, low-risk solutions. The relative importance of these factors varies from customer to customer and is often network dependent. Therefore, network providers with customers or potential customers in various locations desire a solution to provide improved access homing while balancing multiple-network, latency, diversity, and load-balancing needs.

BRIEF DESCRIPTION OF THE DRAWINGS

FIG. 8 shows an exemplary intermediate step in the first homing model and the second homing model.

FIG. 9 shows an exemplary output of one embodiment of the first and second homing models.

FIG. 10 shows an exemplary output of the least-distance calculation of one embodiment of the combination homing model.

FIG. 11 shows an exemplary output of one embodiment of the combination homing model after completing load balancing.

FIG. 12 shows an exemplary embodiment of a load balancing routine.

FIG. 13 shows another exemplary embodiment of a load balancing routine.

FIG. 14 shows a hardware implementation of an exemplary embodiment of a homing model.

DETAILED DESCRIPTION

Figure 1:
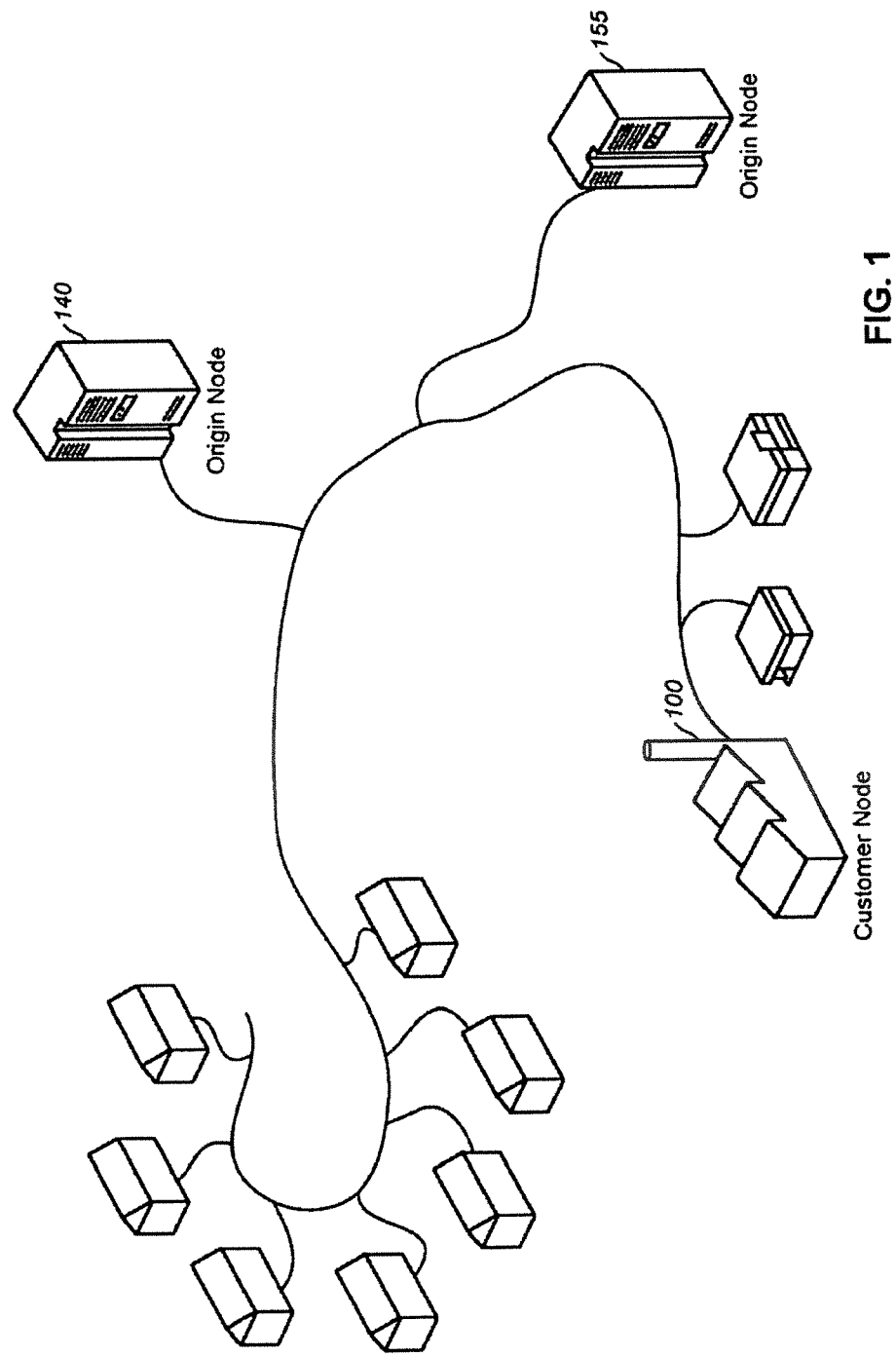
FIG. 1 shows an overview of an exemplary network connecting customers to a provider's network.

Exemplary embodiments are described hereinafter with reference to the accompanying drawings, in which exemplary embodiments and examples are shown. Like numbers refer to like elements throughout.

As will be appreciated, the exemplary embodiments may be implemented as a method, a data processing system, apparatus, or a computer program product. Accordingly, the exemplary embodiments may take the form of an entirely hardware embodiment, an entirely software embodiment, or an embodiment combining software and hardware aspects. Furthermore, the various implementations may take the form of a computer program product on a computer-readable storage medium having computer-readable program instructions (e.g., computer software) embodied in the storage medium. More particularly, implementations of the exemplary embodiments may take the form of web-implemented computer software. Any suitable computer-readable storage medium may be utilized including hard disks, CD-ROMs, optical storage devices, or magnetic storage devices.

The exemplary embodiments are described below with reference to block diagrams and flowchart illustrations of methods, apparatuses, systems, and computer program products. It should be understood that each block of the block diagrams and flowchart illustrations, and combinations of blocks in the block diagrams and flowchart illustrations, respectively, can be implemented by computer program instructions. These computer program instructions may be loaded onto a general purpose computer, special purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that can direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

Accordingly, blocks of the block diagrams and flowchart illustrations support combinations of means for performing the specified functions, combinations of steps for performing the specified functions and program instruction means for performing the specified functions. It should also be understood that each block of the block diagrams and flowchart illustrations, and combinations of blocks in the block diagrams and flowchart illustrations, can be implemented by special purpose hardware-based computer systems that perform the specified functions or steps, or combinations of special purpose hardware and computer instructions.

Overview

In the various embodiments, the term "node" is referenced. A node may be any of a number of devices or components designed to communicate via a communications network. For example, a node may be a repeater, hub, switch, router, bridge, modem, cable modem termination system, mainframe, private branch exchange, arithmetic logic unit, Internet-Dedicated-Ethernet unit, PPI unit, base station transceiver, wire center, base station controller, gateway support node, packet data serving node, handheld electronic device, cellular phone, PDA, receiver, transmitter, server, network-to-network interface, digital subscriber line access multiplexer, aggregator, host, gateway, dumb terminal, smart terminal, desktop computer, laptop computer, point of presence, or any other processing device that facilitates network communication. Furthermore, each node may be configured to communicate with one or more other nodes. The nodes typically communicate using a communications controller to communicate with external communication networks. The external communication networks may interface with the communications controller using a wired data transmission protocol such as X.25, ISDN, DSL, PIP, Ethernet, ATM, frame relay, DOCSIS, or any other wired transmission protocol. Additionally, the node may be configured to communicate with other nodes via wireless external communication networks using a wireless protocol such as 802.11, 802.15.4, or standard 3G, CDMA2000 1x EV-DO, GPRS, W-CDMA, or any other wireless protocol.

In one embodiment, as shown in FIG. 14, the homing model is implemented on a processor 500, such as a computing device, that is configured to perform the functions described in conjunction with the homing model. For example, the apparatus may include a memory device 510 in communication with the processor for storing a homing model application configured to be executed by the processor to perform the functions of the homing model. Additionally, the apparatus can connect to a user interface 520, such as a keyboard, mouse, or touchscreen for receiving user input and a display 530 for providing output, which output may also be stored in memory if desired.

The various embodiments may provide improved routing in combining two legacy networks to determine the least-distance, least-latency routing options while taking into account load balancing and diversity considerations. However, as will be understood, the various embodiments can be applied to a variety of other routing determinations and are not limited to a single network or any specific combination of networks. Moreover, the homing models can be configured to view each network separately or view a combination of networks as a single network.

This capability is helpful for a number of reasons. For example, if a large number or percentage of a customer's locations are homed to a single network gateway and the gateway fails, a substantial number of customer locations would be out of service. Similarly, if the locations are spread out among diverse network gateways and some of the gateways are far removed from the homed customer locations, the potential for increased latency would rise dramatically. Moreover, consider two companies with separate networks merging and thereby producing a single entity with two full-scale networks serving many of the same locations. The distance and latency concerns coupled with the combination of networks would make improved routing determinations difficult. The various embodiments of the homing models described herein provide a solution for improved access homing while balancing latency, load-balancing, and diversity needs by viewing each network in isolation or the combination of networks as a single network.

Figure 2:
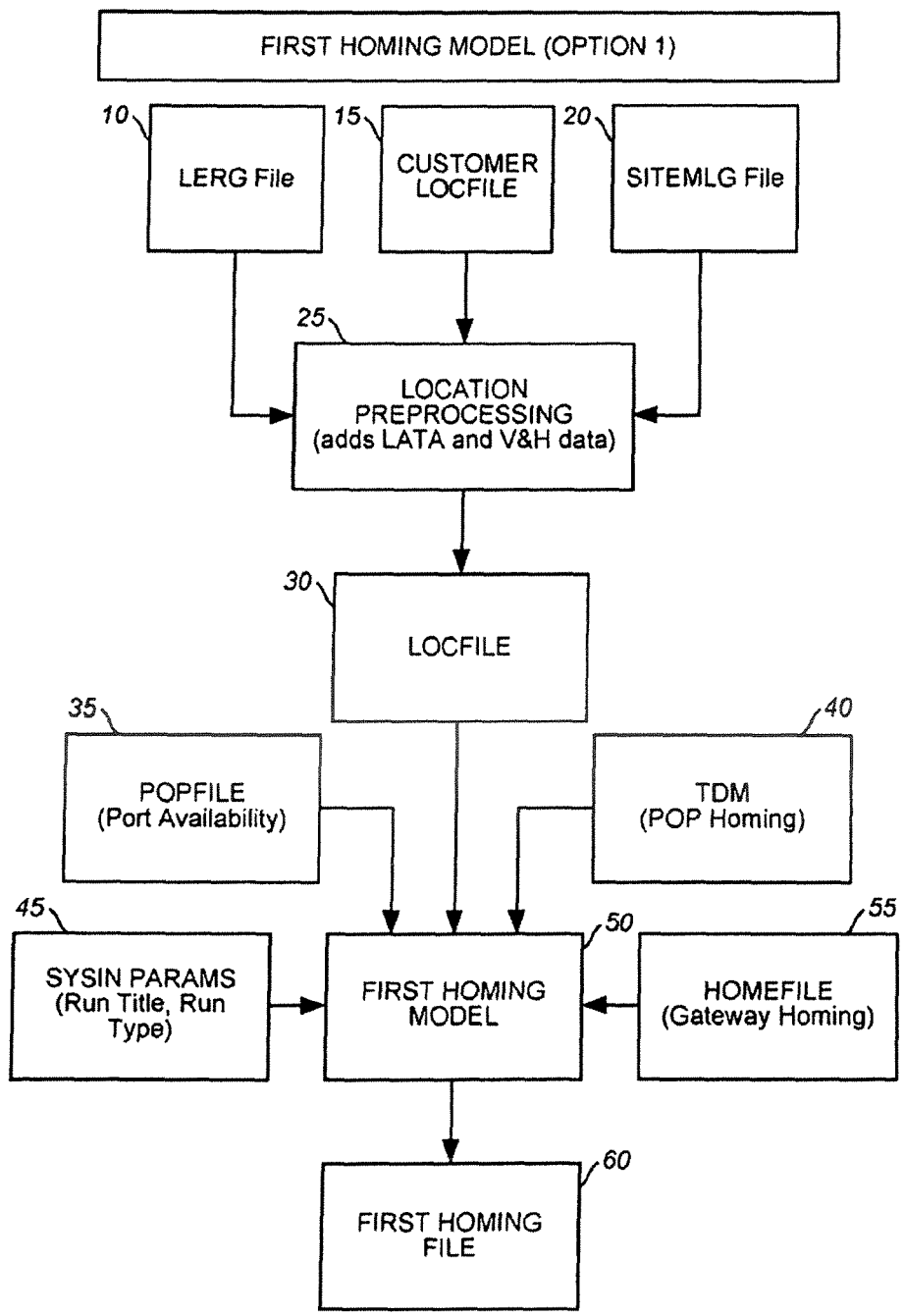
FIG. 2 shows an overview of one embodiment of a first homing model.
Figure 3:
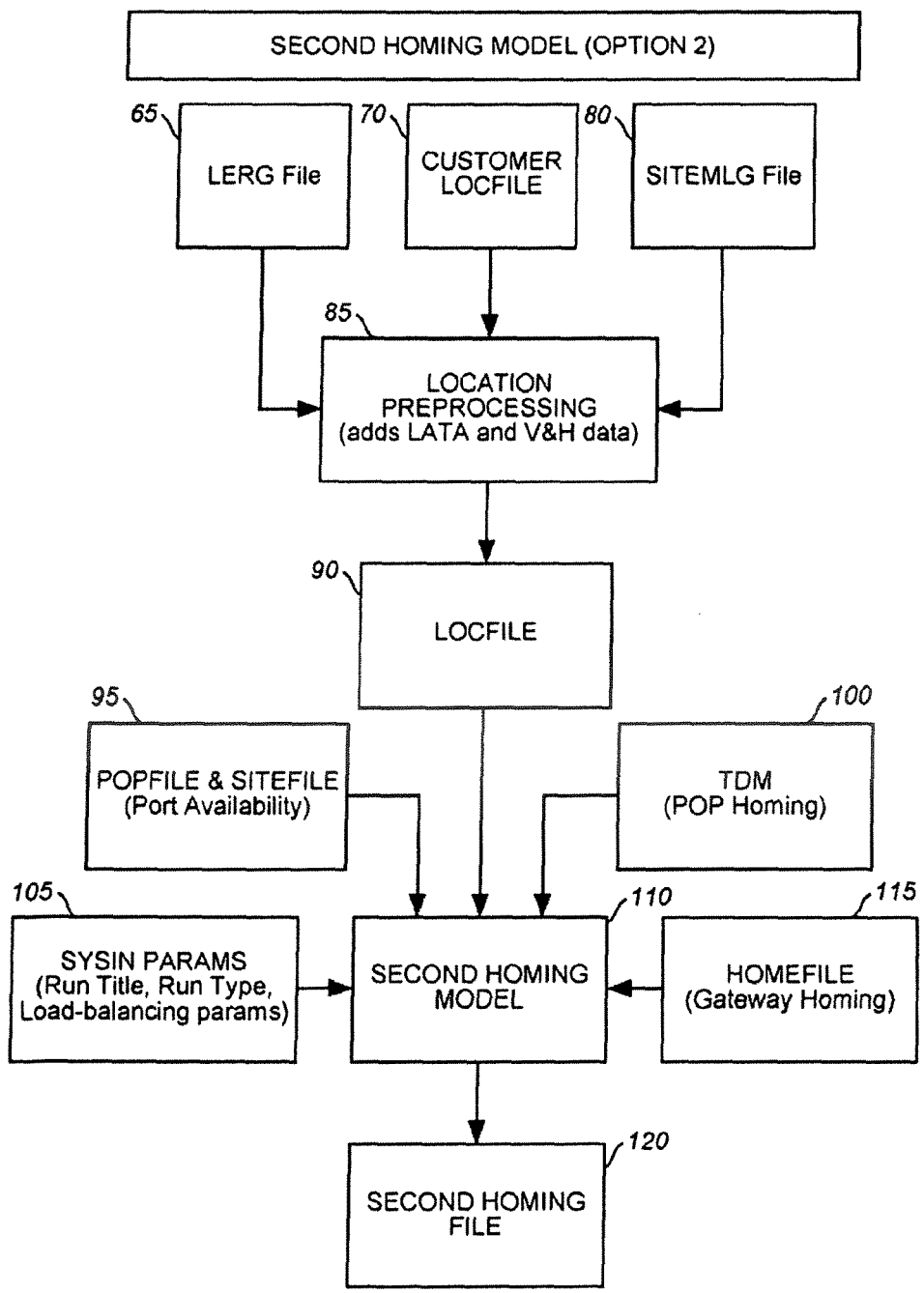
FIG. 3 shows an overview of one embodiment of a second homing model.
Figure 4:
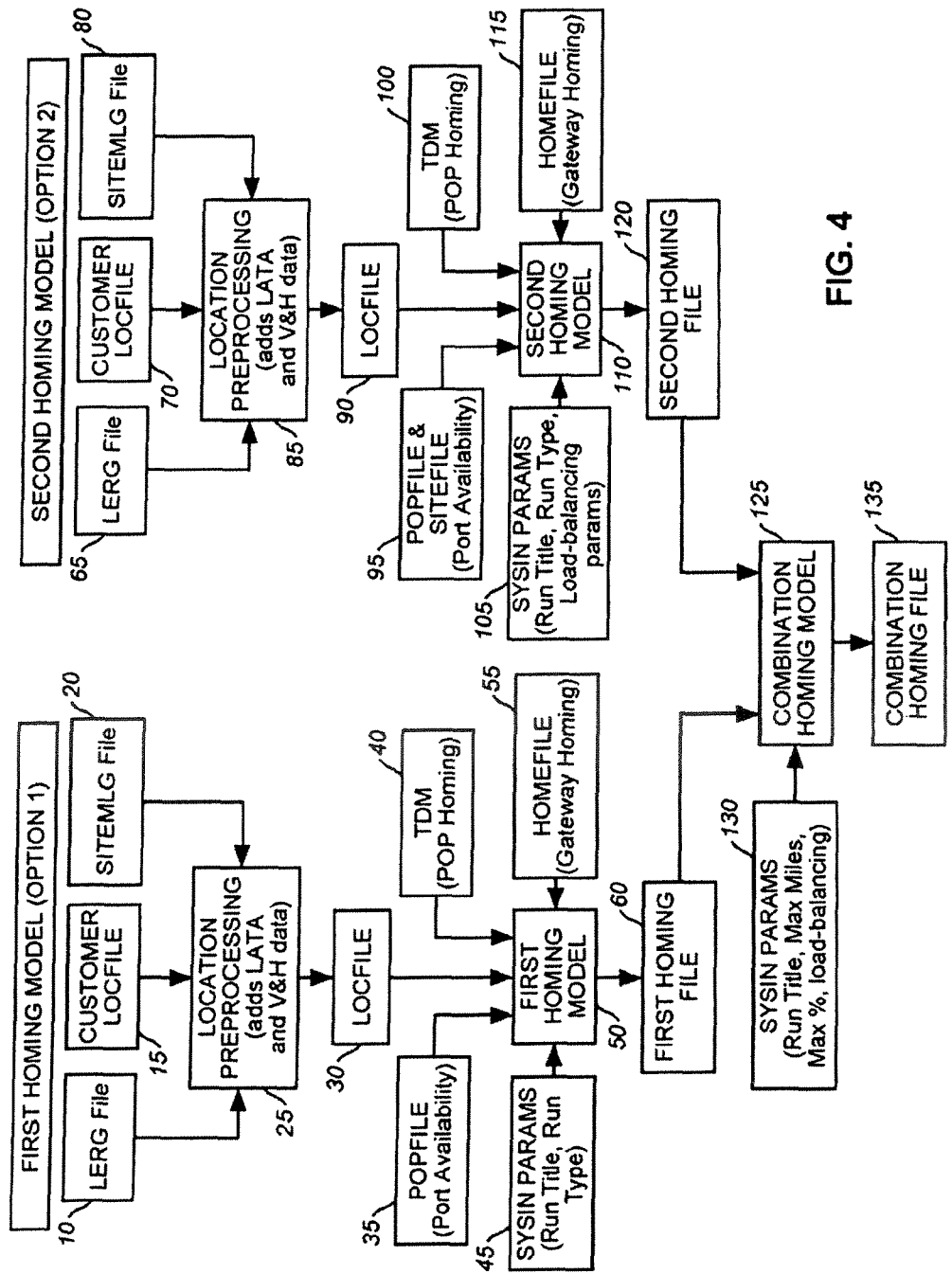
FIG. 4 shows an overview of one embodiment of the first homing model used in combination with the second homing model via a combination homing model.

FIG. 1 shows an overview of an exemplary network connecting customers to a provider's network through an origin node 140, 155, FIGS. 2 and 3 show an overview of one embodiment of a first homing model 50 (also referred to as Option 1) and a second homing model 110 (also referred to as Option 2), including their exemplary inputs for location preprocessing 25, 85: the LERG file 10, 65; the CUSTOMER LOCFILE 15, 70; and the SITEMLG file 20, 80.

In one embodiment, the LERG file 10, 65 typically contains information relating to a particular source location: country code assignments; NPA assignments; LATA codes; destination codes (NPANXX); rate details; operating company numbers; access tandem codes; switching entity record details; and switch homing arrangements. The CUSTOMER LOCFILE 15, 70 provides any needed information regarding a specific customer (each customer typically has at least one CUSTOMER LOCFILE, but depending on the services provided, a customer may have more than one CUSTOMER LOCFILE 50). If for some reason the NPANXX is not found in the LERG file 10, 65, the SITEMLG file 20, 80 can be used as a backup resource to provide this information.

In one embodiment, these inputs are then used in the location preprocessing 25, 85 to determine the nearest point to a customer location for which geographical coordinates, e.g., vertical and horizontal coordinates or longitudinal and latitudinal coordinates, can be obtained. In other words, the customer's NPANXX is read and looked up in the LERG file 10, 65 (or alternatively in the SITEMLG file 20, 80) and added with the geographical coordinates and LATA information. For instance, if the NPANXX number input were 4137474110, the location preprocessing 25, 85 would output 4137474110 (NPANXX); 126 (LATA); 4620, 1408 (V&H Coordinates). The output from the location preprocessing 25, 85 is then stored in the LOCFILE 30, 90, which is used by the homing models to determine the routes.

The functionality of the embodiments of the first homing model 50 and the second homing model 110 will be described separately and then in conjunction with the combination homing model 125. The first homing model 50 can be executed as a stand-alone homing model or combined with the second homing model 110 via the combination homing model 125. If the first homing model 50 is executed as a stand-alone model, it does not necessarily provide for load balancing (although some embodiments may be configured to so provide). Similarly, the second homing model 110 can be executed as a stand-alone homing model or combined with the first homing model 50 via the combination homing model 125. Typically, the second homing model 110 provides for both route determination and load balancing. The combination homing model 125 receives the output from both the first homing model 50 and the second homing model 110 to determine the most effective order of the routes.

Figure 5:
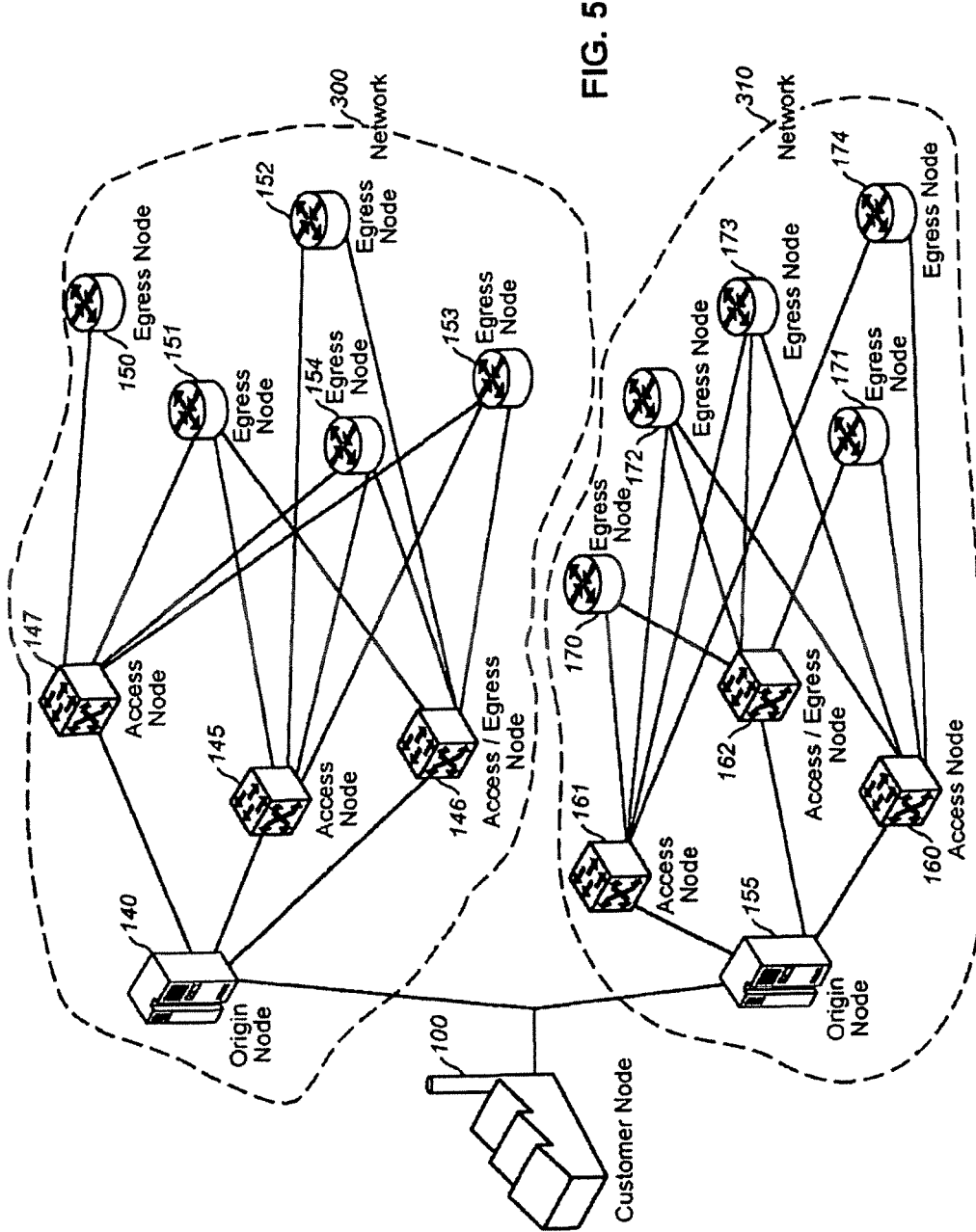
FIG. 5 shows two exemplary networks, which are illustrative and not topologically accurate.

Routing in both the first homing model 50 and the second homing model 110 typically begins at a wire center (i.e., an origin node 140, 155). An exemplary network, which is not topologically accurate, is provided in FIG. 5 to aid in understanding the various embodiments. The origin node 140, 155 is usually a local telephone company office providing service to a given customer location. That is, the origin node 140, 155 is generally the nearest point to a customer location for which geographical coordinates can be obtained. However, the embodiments are not limited to this context and can be adapted to route in any network. From the origin node 140, 155, traffic is routed to an access node 145, 147, 146, 160, 161, 162. Access nodes 145, 146, 147, 160, 161, 162 are typically point of presence locations, i.e., access points to the rest of the network. From the access node 145, 147, 146, 160, 161, 162, traffic is routed to an egress node 150, 151, 154, 153, 181, 172, 173, 174. Egress nodes are typically switches or network gateways that have a desired functionality, e.g., services or ports at the required speeds. However, access nodes can also serve as egress nodes. In essence, the homing models route from the origin node to the access node and then from access node to egress node while providing the capability to adapt for latency, load, and diversity concerns. Each homing model is discussed in turn.

First Homing Model 50

In one embodiment, shown in FIG. 2, the first homing model 50 may obtain data regarding a customer's location (customer node 100) from the LOCFILE 30. The LOCFILE 30 usually contains at least the NPANXX, LATA information, and the geographical coordinates associated with a customer's location (customer node 100). The first homing model may also receive other network related information. For this other network related information, the first homing model 50 may receive the POPFILE 35, the TDM file 40, the HOMEFILE 55, and the SYSIN PARAMS file 45. The POPFILE 35 may contain information relating to the access nodes 145, 146, 147 in the network 300, including the geographical coordinates for each node. In one embodiment, the first homing model 50 can further separate the access nodes by switch port availability, port speeds, or other defining characteristics. The TDM file 40 generally contains information relating to the network's topology. The HOMEFILE 55 may provide the associations between the end offices (end office nodes, i.e., locations serving the origin nodes 140, 155) and the egress nodes 150, 151, 154. In one embodiment, the HOMEFILE 55 may provide multiple egress node choices for each associated access node, e.g., one or more egress nodes for ATM, one or more egress nodes for frame relay, and one or more egress nodes for PIP. In the first homing model 50, the associations in the HOMEFILE 55 may be keyed off of the end office nodes, i.e., the locations serving the wire centers (or origin nodes 140, 155). In an alternative embodiment, the HOMEFILE 55 provides the associations between the access nodes 145, 146, 147 and the egress nodes 150, 151, 154. In yet another embodiment, the HOMEFILE 55 provides the associations between the origin nodes 140, 155 and the egress nodes 150, 151, 154. As will be recognized, the various file inputs can be modified to customize the homing runs or the homing models and are not limiting to the embodiments described herein. The SYSIN PARAMS file 45 may indicate the run title and the run type, e.g., the first homing model 50 or the second homing model 110.

The first homing model 50 can be further configured to receive information relating to non-network nodes, e.g., nodes located in Canada or Puerto Rico. Considering a node as a non-network node is purely a matter of reference. That is, the point of reference determines whether a node is a non-network node or not. For instance, a non-network node could be a node located outside Florida or outside a region in which a service provider has only minimal network coverage. In one embodiment, non-network nodes refer to nodes in Canada. Canada is used in one embodiment because many service providers may have minimal network coverage in Canada. Because of the limited network coverage in this or other areas, service providers often establish relationships with non-network service providers to help provide service to customers requiring network access in the non-network regions. In sum, service providers route their traffic to the non-network service provider's network to hand off the traffic. To achieve this, the first homing model 50 is configured to flag traffic directed to non-network nodes for special processing. The special processing typically indicates that the traffic is routed to a hand-off point. From the hand-off point, the traffic will continue on the non-network service provider's network to its destination. As previously mentioned, in one embodiment, traffic directed to Canada requires special processing to route the traffic to the appropriate hand-off point. The first homing model 50 is therefore configured to flag non-network nodes for special processing and does not home to them during the homing runs.

Once the first homing model 50 has all the necessary information about the network, it performs a straight homing run (excluding non-network nodes from consideration). In a straight homing run, the first homing model 50 homes from the customer's location to the nearest end office serving the origin node 140, 155 by using the geographical coordinates. Based on the origin node 140, the first homing model 50 homes to two access nodes 145, 147: a primary access node and a secondary access node. In another embodiment, the first homing model 50 homes to three access nodes. And in yet another embodiment, the first homing model 50 homes to four access nodes. The closest access node 145 to the origin node 140 is usually the primary access node. The second closest access node 147 is typically the secondary access node. In one embodiment, the first homing model 50 then homes from the primary access node 145 to three distinct egress nodes 151, 153, 154. This embodiment is shown in FIG. 8. In an alternative embodiment, the first homing model 50 homes to three egress nodes 151, 153, 154 from both the primary access node 145 and to three egress nodes 150, 151, 154 from the secondary access node 147. The number of nodes (access nodes and/or egress nodes) to which the first homing model 50 homes can vary depending on the output desired and the network's topology.

Homing to a specific node is determined from the information received by the first homing model 50, e.g., the geographical coordinates. Alternatively, the first homing model 50 uses a least-distance algorithm to determine the routes to each node. In yet another embodiment, the homing model 50 uses the geographical coordinates supplemented by a least-distance algorithm to determine the routes to each node. The route choices are then output indicating the priority order of each route choice, e.g., the first route choice, the second route choice, and the third route choice. In one embodiment, the first homing model 50 only outputs three route choices: the routes from the primary access node 145 to the three distinct egress nodes 151, 153, 154. The route choices can be output (printed, transmitted, displayed, or otherwise communicated) to the user or stored in the first homing file 60. An exemplary output is shown in FIG. 9. Thus, in one embodiment, the first homing file 60 stores the three best route choices from the origin node 140 to the access node 145 and from the access node 145 to the egress nodes 151, 153, 154. In one embodiment, the first homing model 50 does not provide load balancing for the route choices. However, alternative embodiments do provide for the load balancing functionality as described under the second homing model 110. If the first homing model 50 is used in conjunction with the second homing model 110, the combination homing model 125 would use the first homing file 60 as input.

As previously mentioned, the first homing model 50 can be implemented as a method, data processing system, apparatus, or computer program product. In one embodiment of the present invention, a system implements the first homing model 50 as a module: a route choice provider module. The route choice provider module is configured to at least perform the functions previously described.

Second Homing Model 110

The second homing model 110, shown in FIG. 3, not only provides for route determination, but also performs load balancing. In one embodiment, the second homing model 110 may receive data from the LOCFILE 70. The LOCFILE 70 typically contains the NPANXX, LATA information, and the geographical coordinates associated with a customer's location (customer node 100). The second homing model 110 may also receive the POPFILE & SITEFILE 95, the TDM file 100, the HOMEFILE 115, and the SYSIN PARAMS file 105. The POPFILE & SITEFILE 95 may contain information relating to the access nodes 160, 161, 162 in the network 310, such as the geographical coordinates, city, and state of each access node 160, 161, 162. The second homing model 110 can separate the access nodes by switch port availability, port speeds, or other defining characteristics. The TDM file 100 typically contains information relating to the network's topology.

The HOMEFILE 115 may provide the associations between the access nodes 160, 161, 162 and the egress nodes 171, 172, 173, 174. In one embodiment, the HOMEFILE 120 provides multiple egress node choices for each associated access node, e.g., one or more egress nodes for ATM, one or more egress nodes for frame relay, and one or more egress nodes for PIP. In an alternative embodiment, the HOMEFILE 110 provides the associations between the origin nodes 140, 155 and the egress nodes 170, 171, 173, 174. As will be recognized, the various file inputs can be modified to customize the homing runs and are not limiting to the embodiments described herein. The SYSIN PARAMS file 105 generally indicates the run title, the run type, and the load balancing parameters. The run title and run type of the SYSIN PARAMS file 105 typically indicate which homing model to execute, e.g., the first homing model 50 or the second homing model 110. The load balancing parameters allow the user to define the load for the entire network or each node. For example, the user could establish 10% as the loading threshold for the entire network. This loading threshold would then be applied to each individual egress node. The loading threshold itself is determined based on an analysis of customer requirements, e.g., balancing the customer's desire for route diversity (reducing potential single points of failure) and the customer's sensitivity to latency issues (the time it takes for data to transverse the network). Because each input has network-related consequences, e.g., a longer backhaul yields greater latency, the inputs are typically customer dependent. The actual implementation of load balancing is discussed below in greater detail. In one embodiment, the second homing model 110 is not configured to receive information about non-network nodes, but in other embodiments it is so configured.

In implementation, the second homing model 110 begins after receiving the network information from the various inputs previously described (information regarding the access nodes, egress nodes, origin nodes, and the customer node). The second homing model then homes to two access nodes 160, 161. In another embodiment, the second homing model 110 homes to three access nodes. And in yet another embodiment, it homes to four access nodes. The access node closest to the origin node 155 is typically considered the primary access node 161. The second closest access node to the origin node 155 is usually considered the secondary access node 160. After homing to the closest access nodes 160, 161, the second homing model 110 then homes from the primary access node 161 to three distinct egress nodes 170, 172, 173. This embodiment is shown in FIG. 8. In another embodiment, the second homing model 110 homes to three egress nodes 170, 172, 173, 174 from both the primary access node 161 and the secondary access node 160. The number of nodes to which the second homing model 110 homes can vary depending on the output desired and the network's topology. In other words, the homing models are configurable to adapt to varying customer needs as determined by the network, user, or customer. For instance, if a customer desires extreme diversity, the second homing model 110 can be configured to home to four access nodes and four egress nodes from each access node. Homing to a specific node is determined from the information received by the second homing model 110, e.g., the geographical coordinates. Alternatively, the second homing model 110 uses a least-distance algorithm to determine the routes to each node. In yet another embodiment, the second homing model 110 uses the geographical coordinates supplemented by a least-distance algorithm to determine the routes to each node.

Figure 6:
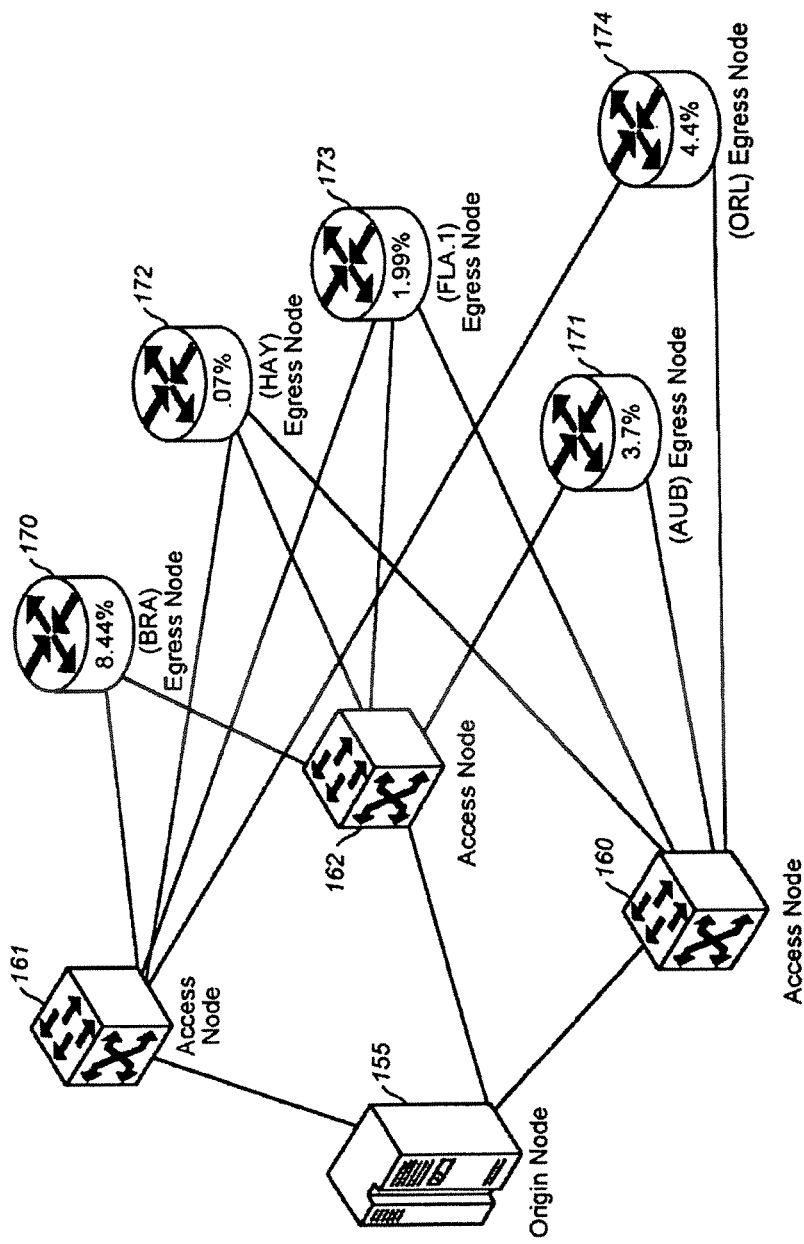
FIG. 6 shows an exemplary network with the associated node names and loads.

In one embodiment, after determining the routes from the access node 161 to the egress nodes 170, 172, 173, the second homing model 110 performs load balancing if necessary. Load balancing is only performed if the loading threshold (often expressed as the goal) has not been reached. The loading goal/threshold is generally defined by the user, such as via the load balancing parameters in the SYSIN PARAMS file 105. It can be defined as the maximum number of locations per node or it can be expressed as a percentage. For instance, the user could establish 5% or 10% as the loading threshold for the entire network. This loading threshold would then be applied to each individual egress node as each egress node's loading threshold. In an alternative embodiment, the loading threshold for the network can be different than the loading threshold for a given egress node. Before load balancing is performed, however, the second homing model 110 evaluates the loading threshold of the network or the nodes to determine if load balancing is even necessary. In other words, if the network's or each egress node's load is below the loading threshold, load balancing will not be performed. Thus, for instance, if the loading threshold for the network is set to 5%, load balancing will only be performed if the network's or an egress node's load exceeds 5%. Illustratively, as shown in FIG. 6, if the second homing model 110 were to resolve BRA (egress node name), 170 (egress node number), 8.44% (load); HAY (egress node name), 172 (egress node number), 0.07% (load); and FLA.1 (egress node name), 173 (egress node number), 1.99% (load) as the egress nodes of the first, second, and third route choices respectively, the load on the BRA egress node would require that load balancing be performed (because the BRA egress node 170 exceeds the 5% loading threshold at 8.44%). Therefore, load balancing would then be performed according to the embodiments.

Figure 7:
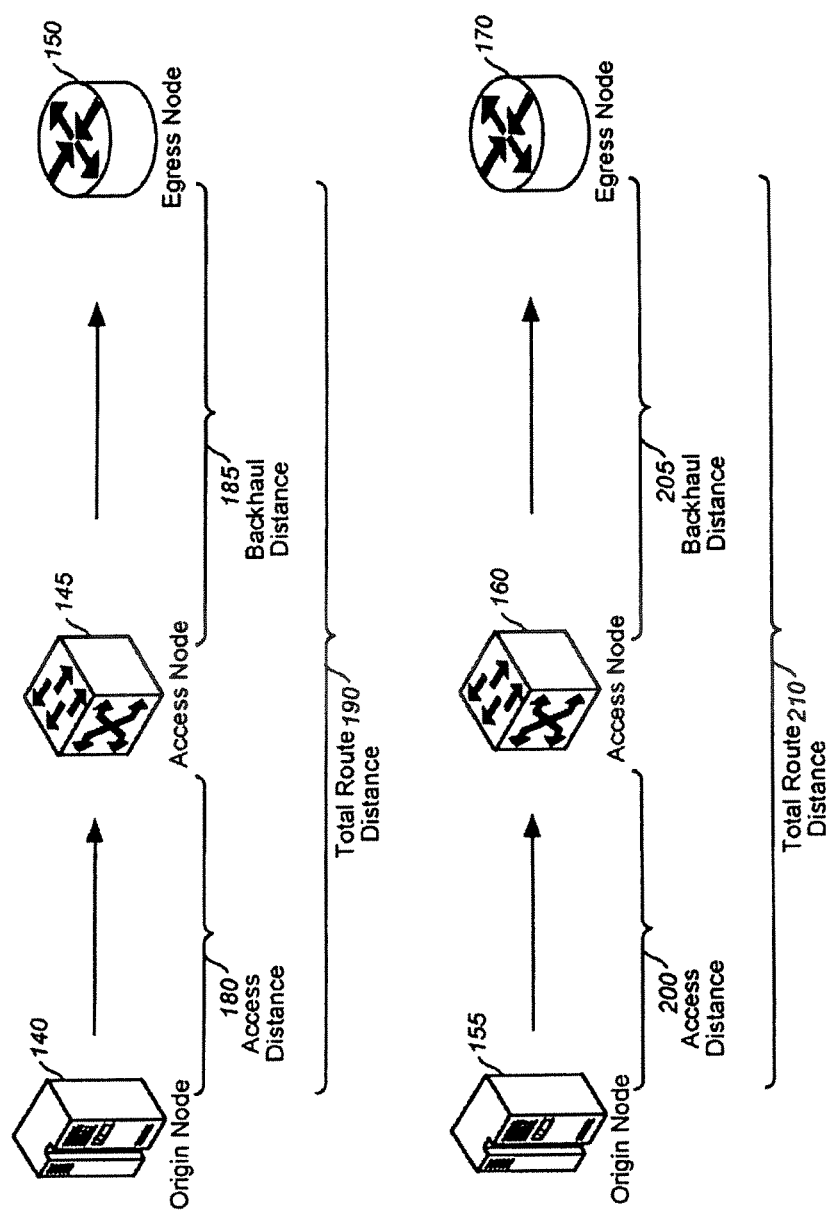
FIG. 7 shows exemplary distances used by the homing models in making route choice comparisons.

The loading threshold itself is determined based on the analysis of customer requirements, e.g., balancing the customer's desire for diversity (reducing potential single points of failure) and the customer's sensitivity to latency issues (the time it takes for data to transverse the network). Thus, in one embodiment, load balancing allows the user to define tradeoffs (increases) in the backhaul mileage for using the HAY egress node 172 for offloading work from the BRA egress node 170. The backhaul mileage is the distance from the access node to the egress node, as shown in FIG. 7.

FIG. 12 shows an exemplary embodiment of a load balancing module in which the load balancing is executed in an iterative manner. To execute the load balancing, the second homing model 110 uses progressive banding to allow for a tradeoff of increased backhaul mileage if it will lower the load of a given egress node. For example, the route from the access node 161 to the egress node 170, considered as the first route choice, would be swapped with the route from the access node 161 to the egress node 172 if certain conditions are met. Although it would increase the backhaul distance (i.e., latency), it would reduce the egress node's 170 load: the goal of load balancing.

However, other conditions must also generally be met to execute a swap. The conditions that must be met are set by the user, such as a result of variables defined by the SYSIN PARAMS file 105. As previously mentioned, the user defines the loading threshold of the network and the egress nodes. A tolerance factor is used to specify the permissible tradeoff distance to offload work from an egress node. An iteration count is used to track the number of iterations of the iterative step, which is performed a fixed number of times (the iteration count starts with a value of one and is increased by one after each iteration). The fixed number of times defines the number of times the iteration is performed and the percentage increase in the additional miles allowed during each iteration.

The progressive banding of load balancing is the aspect that allows for incremental increases in the permissible backhaul distance from the access node to the egress node. The increase in allowable backhaul distance is defined by the equation: ((iteration count/fixed number of times)*tolerance factor). In one embodiment, the fixed number of times is set to 10, which means the iterative step can be performed up to 10 times and the increased backhaul distance will be evaluated in tenths of the defined tolerance factor ((iteration count/10) *tolerance factor). That is, on the first iteration, 1/10 of the tolerance factor is used as the allowable, increased backhaul distance (to offload work from an egress node and decrease the load of the egress node). The iteration continues until the tenth iteration, if necessary, in which the full tolerance factor ((10/10)*tolerance factor) is used as the allowable, increased backhaul distance. The tolerance factor could be set to 50 miles, 100 miles, or any other distance desired. At the end of each iteration, the load balancing determines if the loading threshold has been reached. If it has been reached, the load balancing ends. If it has not been reached, another iteration will be performed.

Illustratively, if the tolerance factor is set at 50 miles (allowing a 50 mile maximum tradeoff), the load balancing would be executed to allow for increases in backhaul distance in 5 mile increments. For instance, on the initial iteration, the allowable, increased backhaul distance would be 5 miles ((1/10)*50). Similarly, in the second iteration, the allowable, increased backhaul distance would be 10 miles ((2/10)*50) and so on with each iteration. If necessary, this would continue, as indicated in FIG. 12, until the final iteration in which the allowable, increased backhaul distance would be 50 miles ((10/10)*50): the full tolerance factor. If the value of the tradeoff, as defined by the second homing model 110, is satisfactory (i.e., satisfying other conditions), the compared routes will be swapped. This provides the user with control over the latency, diversity, and load balancing of the network. As noted above, however, there are other conditions that must generally be met to execute a swap.

The other conditions that must be satisfied before routes are swapped are also predefined, such as in the SYSIN PARAMS file 105. In one embodiment, the conditions require the egress node of the first route choice to exceed the loading threshold and the egress node of the subsequent route choice being compared to not exceed the loading threshold. A portion of an exemplary load balance routine is reproduced below:

If $1^{st}$ choice egress node exceeds the loading threshold AND
If $2^{nd}$ choice egress node does not exceed the loading threshold AND
If the distance from the access node to the egress node of the $2^{nd}$ choice < (((ITERATION COUNT/fixed number of times) * FIRST TOLERANCE FACTOR) + the distance from the access node to the egress node of the $1^{st}$ choice)
Then swap $1^{st}$ & $2^{nd}$ choice routes and adjust node counters.

If all of the conditions are satisfied, the routes are swapped. Effectively, this means that the route choice that was previously designated as the first route choice is now designated as the subsequent route choice and that the route choice previously designated as the subsequent route choice is now designated as the first route choice. The load balance swap comparison can be used for any number of the routes desired. In one embodiment, the first route choice is compared to the second route choice and the route choices are swapped if (1) routing through the egress node of the first route choice exceeds its loading threshold, (2) routing through the egress node of the second route choice does not exceed its loading threshold, and (3) if the distance from the access node to the egress node of the second route choice is less than the iteration count divided by the first fixed number of times multiplied by a tolerance factor summed with the distance from the access node to the egress node of the first route choice. In the same embodiment, the first route choice is then compared to the third route choice in a similar manner.

In practice, the swap comparison can be performed with as few or as many subsequent route choices as desired. In some embodiments, it may not be necessary to compare the first route choice with each subsequent route choice because of the topology of the network. In one embodiment, the load balance compares the first route choice with the second route choice and then the first route choice with the third route choice. In essence, the load balance reorders the priority of the route choices if the increased backhaul distance is acceptable to the user and the load of the egress node exceeds the loading threshold.

Moreover, as will be recognized, load balancing can be performed many ways. It in essence allows the user to define the tradeoff in the increased backhaul distance for reducing the load of an egress node. After load balancing, the route choices are then output indicating the priority order of each route choice, e.g., the first route choice, the second route choice, and the third route choice. In one embodiment, the second homing model 110 only outputs three route choices: the routes from the primary access node 161 to three distinct egress nodes 170, 172, 173. The route choices can be output (printed, transmitted, displayed, or otherwise communicated) to the user or stored, such as in the second homing file 120. An exemplary output is shown in FIG. 9. The ordering of the route choices is determined by load balancing. Thus, in one embodiment, the second homing file 120 stores the three best route choices from the origin node 155 to the access node 161 and from the access node 161 to the egress nodes 170, 172, 173. In addition, if the second homing model 110 is used in conjunction with the first homing model 50, the combination homing model 125 will use the second homing file 120 as input. As will be recognized, the various embodiments can take many forms.

As previously mentioned, these steps can be implemented as a method, data processing system, apparatus, or computer program product. In one embodiment, a system implements the second homing model 110 as a pair of modules: a route choice provider module and a load balancing module. The route choice provider module is configured to at least perform the functions previously described. In one embodiment, the second homing model 110 is not configured to provide for load balancing, but, as will be recognized, it can be so configured.

Combination Homing Model 125

The combination homing model 125 allows for multiple outputs (e.g., from multiple networks or multiple homing iterations) to be combined to produce a single routing output. This can be useful for a service provider with two separate networks with each network providing services to many of the same customers. For example, if Company A merged with Company B, and each company owned its own networks with both networks servicing the same customers, determining the most efficient routing to a single customer with the option of multiple networks could be difficult. To make the routing determinations, the combination homing model 125 receives multiple inputs, orders the routes, and then performs load balancing if necessary.

As input, the combination homing model 125 receives the output from the first homing model 50 and the output from the second homing model 110. An exemplary input is shown in FIG. 9—output from the first homing model 50 and the second homing model 110. In one embodiment, the combination homing model 125 receives the first homing file 60 (storing the three route choices from network 300) and the second homing file 120 (storing the three route choices from network 310). The combination homing model 125 also receives as input the run title and the load balancing parameters, such as from the SYSIN PARAMS file 130. As mentioned, the load balancing parameters allow the user to define the load for the entire network or each node individually.

In one embodiment, after receiving the inputs, the combination homing model 125 orders the six route choices in a least-distance order. The least distance order, as shown in FIG. 7, is determined by summing the distance from the origin node to the access node (the access distance 180, 200) with the distance from the access node to the egress node (the backhaul distance 185, 205) for each route choice. Thus, the combination homing model 125, or in another embodiment a least-distance module, determines the total route distance 190, 210 for each inputted route choice. The route choices are then indicated as a first route choice, second route choice, third route choice, fourth route choice, fifth route choice, and sixth route choice in a least distance order. That is, the first route choice is the route choice with the least total route distance 190, 210 and so on. An exemplary embodiment after the least-distance determination is shown in FIG. 10. As will be understood, the embodiments are neither limited to receiving a specific number of route choices nor constrained to a particular method of ordering the routes in a least-distance order. In fact, many different methods for ordering the routes may be employed within the scope of the various embodiments.

After ordering the routes, load balancing is performed in the combination homing model 125 in the same manner as it is in the second homing model 110. FIG. 13 shows an exemplary embodiment of the load balancing routine. In one embodiment, the load balancing uses the same parameters as in the second homing model 110, such as those provided by the SYSIN PARAMS file 130. As with the second homing model 110, load balancing is only performed if the network or an egress node exceeds the loading threshold as defined by the load balancing parameters.

The load balancing uses progressive banding that allows for incremental increases in the permissible backhaul distance from the access node to the egress node as a tradeoff for reducing an egress node's workload. The progressive banding is defined by the equation ((iteration count/fixed number of times)*tolerance factor). This calculation is used to determine the value of the tradeoff. The iteration count is used to track the number of iterations of the iterative step, which is performed a fixed number of times (the iteration count starts with a value of one and is increased by one after each iteration). The fixed number of times defines the number of times the iteration is performed and the percentage increase in the additional miles allowed during each iteration. The tolerance factor specifies the permissible tradeoff in backhaul distance to offload work from an egress node. If the value of the tradeoff, as defined by the combination homing model 125, is satisfactory (i.e., satisfying other conditions), the compared routes will be swapped. This provides the user with control over the latency, diversity, and load balancing of the network. As described above, however, there are other conditions that must generally be met to execute a swap.

The other conditions that must be satisfied before routes are swapped are also predefined, such as in the SYSIN PARAMS file 130. In one embodiment, the conditions require the egress node of the first route choice to exceed the loading threshold and the egress node of the subsequent route choice being compared to not exceed the loading threshold. A portion of one embodiment of the load balancing routine is reproduced below:

---

If $1^{st}$ choice egress node exceeds the loading threshold AND
If $2^{nd}$ choice egress node does not exceed the loading threshold AND
If the distance from the access node to the egress node of the $2^{nd}$ choice < (((ITERATION COUNT/fixed number of times) * SECOND TOLERANCE FACTOR) + the distance from the access node to the egress node of the $1^{st}$ choice)
Then swap $1^{st}$ & $2^{nd}$ choice routes and adjust node counters.

---

If all of the conditions are satisfied, the routes are swapped. Effectively, this means that the route choice that was previously designated as the first route choice is now designated as the subsequent route choice and that the route choice previously designated as the subsequent route choice is now designated as the first route choice. As previously stated, the swap comparison can be performed with as few or as many subsequent route choices as desired. In some embodiments, it may not be necessary to compare the first route choice with each subsequent route choice because of the network's topology. In fact, in a preferred embodiment, the load balance compares the first route choice with the second route choice, the first route choice with the third route choice, the first route choice with the fourth route choice, and then the first route choice with the fifth route choice. In yet another embodiment, each route choice is compared to every other route choice. Essentially, the load balance reorders the priority of the route choices if the increased backhaul distance is acceptable to the user and the load of the egress node exceeds the loading threshold.

After load balancing, the route choices are output indicating the priority of each route choice, e.g., the first route choice, the second route choice, the third route choice, the fourth route choice, the fifth route choice, and the sixth route choice. The route choices can be output (printed, transmitted, displayed, or otherwise communicated) to the user or stored in the combination homing file 135. An exemplary output after load balancing is shown in FIG. 11.

CONCLUSION

As previously mentioned, the embodiments can be implemented as a method, data processing system, apparatus, or computer program product. In one embodiment, a system implements the embodiments as modules such as first route choice provider module, a second route choice provider module, a first load balancing module, a sorting module, and a second load balancing module. In essence, the embodiments provide a solution for improved access homing while balancing latency, load-balancing, and diversity needs by viewing each network in isolation or the combination of networks as a single network. Although various embodiments were described as receiving specific inputs for particular networks, it will be understood that the various embodiments are not limited to receiving inputs or determining routes in any particular network. Rather, they can be implemented in almost any application for determining the shortest routes while balancing latency, load, and diversity needs.

In the preceding specification, various embodiments have been described with reference to the accompanying drawings. It will, however, be evident that various modifications and changes may be made thereto, and additional embodiments may be implemented, without departing from the broader scope of the invention as set forth in the claims that follow. For example, while particular files have been referenced, the information, instead, may be obtained from other sources. The specification and drawings are accordingly to be regarded in an illustrative rather than a restrictive sense.

That which is claimed:

1. A method comprising:
   homing, using at least one computer processor, to at least two access nodes;
   homing a route from at least one of the at least two access nodes to each of a plurality of egress nodes, thereby creating respective route choices between the at least one access node and each of the plurality of egress nodes;
   ordering the route choices in a least distance order;
   performing load balancing for a plurality of the ordered route choices in the event a predefined loading threshold has not been satisfied, wherein the predefined loading threshold is based at least in part on one or more customers' latency requirements; and
   outputting first homing route choices as a first output homing record,
   wherein performing load balancing comprises altering an ordering of a first route choice and a second route choice of the ordered route choices based on (i) a distance from the at least one access node to an egress node of the second route choice and (ii) a distance from the at least one access node to an egress node of the first route choice,
   the load balancing is repeated iteratively for either a predefined number of iterations or until the predefined loading threshold is satisfied, and
   altering the ordering of the first route choice and the second route choice of the ordered route choices is further based on a determination that a) a first route through the egress node of the first route choice violates the predefined loading threshold, b) a second route through the egress node of the second route choice satisfies the predefined loading threshold, and c) the distance from the at least one access node to the egress node of the second route choice satisfies a predefined criteria that is based upon a first tolerance factor and the distance from the at least one access node to the egress node of the first route choice.

2. The method of claim 1, further comprising:
   receiving data corresponding to a plurality of second access nodes;
   receiving data corresponding to a plurality of end office nodes, data corresponding to a plurality of second egress nodes, and data corresponding to associations between the plurality of end office nodes and the plurality of second egress nodes;
   receiving data corresponding to a plurality of non-network nodes;
   receiving data corresponding to a customer node and data corresponding to a second origin node;
   determining if the customer node is associated with one of the non-network nodes;
   in response to determining that the customer node is associated with one of the non-network nodes, indicating that the customer node requires alternative processing;
   homing to an end office node of the plurality of end office nodes serving the second origin node;
   homing to a plurality of the second access nodes;
   homing a route from at least one of the second access nodes to each of the plurality of second egress nodes, thereby creating second homing route choices between a pair of second access nodes and second egress nodes; and
   outputting the second homing route choices as a second output homing record.

3. The method of claim 2, further comprising:
   ordering the first homing route choices from the first output homing record and the second homing route choices from the second output homing record in a least-distance order;
   performing a second load balancing for a plurality of the first and second homing route choices if the predefined loading threshold has not been satisfied; and
   outputting final route choices as a final output homing record.

4. The method of claim 3, wherein ordering the first homing route choices from the first output homing record and the second homing route choices from the second output homing record in a least-distance order comprises summing an access distance from a first or the second origin node to one of the at least two access nodes with a backhaul distance from the one of the at least two access nodes to one of the plurality of egress nodes for the first and second homing route choices and ordering the first and second homing route choices in least-distance order wherein a least-distance route is indicated as the first route choice.

5. The method of claim 1, wherein
   altering the ordering of the first route choice and the second route choice of the ordered route choices is further based on a determination that a) the first route through the egress node of the first route choice violates the predefined loading threshold, b) the second route through the egress node of the second route choice satisfies the predefined loading threshold, and c) the distance from the at least one access node to the egress node of the second route choice satisfies a second predefined criteria that is based upon a second tolerance factor and the distance from the at least one access node to the egress node of the first route choice.

6. The method of claim 1, wherein the load balancing further comprises reducing potential single points of failure.

7. A computer program product comprising a non-transitory computer-readable storage medium having computer-readable instructions stored therein, wherein the computer-readable instructions are configured to be readable from the at least one medium by at least one computer processor and thereby cause the at least one computer processor to operate so as to:
   home to at least two access nodes;
   home a route from at least one of the at least two access nodes to each of a plurality of egress nodes, thereby creating respective route choices between the at least one access node and each of the plurality of egress nodes;

order the route choices in a least distance order;
perform load balancing for a plurality of the ordered route choices if a predefined loading threshold has not been satisfied, wherein the predefined loading threshold is based at least in part on one or more customers' latency requirements;
  repeat the load balancing iteratively for either a predefined number of iterations or until-the predefined loading threshold is satisfied; and
output first homing route choices as a first output homing record,
wherein load balancing comprises altering an ordering of a first route choice and a second route choice of the ordered route choices based on (i) a distance from the at least one access node to an egress node of the second route choice and (ii) a distance from the at least one access node to an egress node of the first route choice, and
  altering the ordering of the first route choice and the second route choice of the ordered route choices is further based on a determination that a) a first route through the egress node of the first route choice violates the predefined loading threshold, b) a second route through the egress node of the second route choice satisfies the predefined loading threshold, and c) the distance from the at least one access node to the egress node of the second route choice satisfies a predefined criteria that is based upon a first tolerance factor and a distance from the at least one access node to the egress node of the first route choice.

8. The computer program product of claim 7, wherein the instructions are further configured to cause the at least one computer processor to operate so as to:
  receive data corresponding to a plurality of second access nodes;
  receive data corresponding to a plurality of end office nodes, data corresponding to a plurality of second egress nodes, and data corresponding to associations between the plurality of end office nodes and the plurality of second egress nodes;
  receive data corresponding to a plurality of non-network nodes;
  receive data corresponding to a customer node and data corresponding to a second origin node;
  determine if the customer node is associated with one of the non-network nodes;
  in response to determining that the customer node is associated with one of the non-network nodes, to indicate that the customer node requires alternative processing;
  home to an end office node of the plurality of end office nodes serving the second origin node;
  home to a plurality of the second access nodes;
  home a route from at least one of the second access nodes to each of the plurality of second egress nodes, thereby creating second homing route choices between a pair of second access nodes and second egress nodes; and
  output the second homing route choices as a second output homing record.

9. The computer program product of claim 8, wherein the instructions are further configured to cause the at least one computer processor to operate so as to:
  order the first homing route choices from the first output homing record and the second homing route choices from the second output homing record in a least-distance order;
  perform a second load balancing for a plurality of the first and second homing route choices if the predefined loading threshold has not been satisfied; and
  output final route choices as a final output homing record.

10. The computer program product of claim 9, wherein ordering the first homing route choices from the first output homing record and the second homing route choices from the second output homing record in a least-distance order comprises:
  summing an access distance from a first or the second origin node to one of the at least two access nodes with a backhaul distance from the one of the at least two access nodes to one of the plurality of egress nodes for each route choice; and
  indicating a least-distance route as the first route choice.

11. The computer program product of claim 7, wherein altering the ordering of the first route choice and the second route choice of the ordered route choices is further based on a determination that a) the first route through the egress node of the first route choice violates the predefined loading threshold, b) the second route through the egress node of the second route choice satisfies the predefined loading threshold, and c) the distance from the at least one access node to the egress node of the second route choice satisfies a second predefined criteria that is based upon a second tolerance factor and the distance from the at least one access node to the egress node of the first route choice.

* * * * *